Aug. 1, 1939.   W. J. MILLER   2,168,069
TRAILER
Filed June 21, 1937   2 Sheets-Sheet 1

Inventor
Willard J. Miller,
By
Barthel & Barthel
Attorneys

Aug. 1, 1939.  W. J. MILLER  2,168,069
TRAILER
Filed June 21, 1937  2 Sheets-Sheet 2
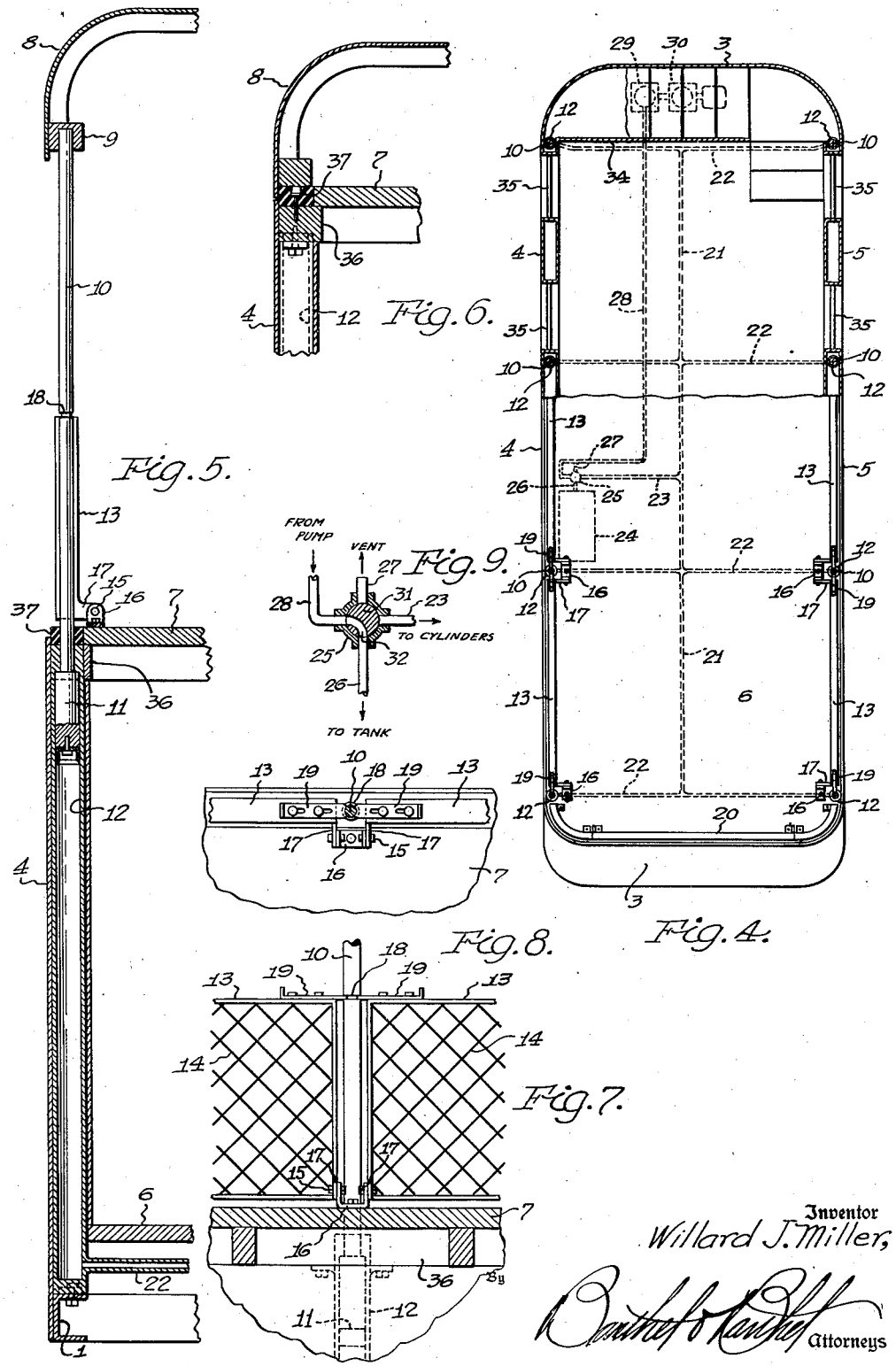
Inventor
Willard J. Miller,
Attorneys Patented Aug. 1, 1939

2,168,069

UNITED STATES PATENT OFFICE 2,168,069

TRAILER

Willard J. Miller, Detroit, Mich.

Application June 21, 1937, Serial No. 149,283

7 Claims. (Cl. 296—107)

This invention relates particularly to an automobile trailer, and an object of the invention is to provide a construction wherein the roof portion of the trailer is adapted to be elevated to provide an open upper deck, and to provide the device with means for elevating the roof portion and for locking the same in elevated position. A further object is to provide a trailer having an upper deck with stanchinons or posts along the sides of the deck, the upper ends of which posts are connected to the roof and are adapted to be moved to raise and lower the roof.

It is also an object to provide a foldable rail or barrier to extend along the sides and across the ends of the uper deck and which barrier is arranged in sections adapted to fold inwardly beneath the roof when the same is lowered, and to provide means for locking the barrier in operative position, and means, for pivotally connecting the sections of the barrier to the deck.

It is also an object to provide a trailer body adapted to form living quarters and the ceiling of which forms an upper deck for the trailer, a stairway being provided within the body to afford access to the upper deck from the living quarters, and to provide the body with means for automatically raising and lowering the roof. It is also an object to provide means for sealing the joint between the roof and body when the roof is lowered, which means forms a yieldable seat for the roof in lowered position to prevent vibration and noise.

A further object is to provide certain other new and useful features in the construction, arrangement, and combination of parts, all as hereinafter more fully described, reference being had to the accompanying drawings, in which Figure 1 is a side elevation of a trailer illustrative of an embodiment of the present invention and showing the roof portion in lowered position;

Fig. 4 is a longitudinal horizontal section substantially upon the line 4—4 of Fig. 2;

Fig. 5 is an enlarged sectional detail showing the upper and lower decks together with the means for raising the roof which is shown in raised position;

Fig. 6 is a cross sectional detail showing a portion of the upper deck and a portion of the roof in lowered position;

Fig. 7 is a detail showing guard rails or barriers for the upper deck and means for locking the same in operative position and for locking the roof in elevated position;

Fig. 8 is a detail plan view of Fig. 7, and

Fig. 9 is a sectional detail of a control valve for controlling the operation of pneumatic means for raising and lowering the roof.

Figure 2:
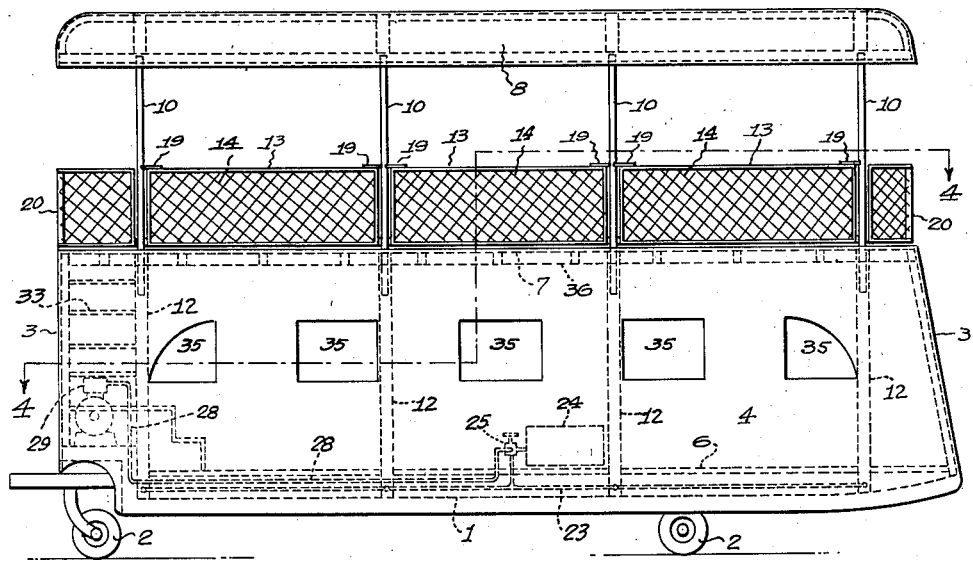
Fig. 2 is a side elevation of the trailer showing the roof in raised position.
Figure 1:
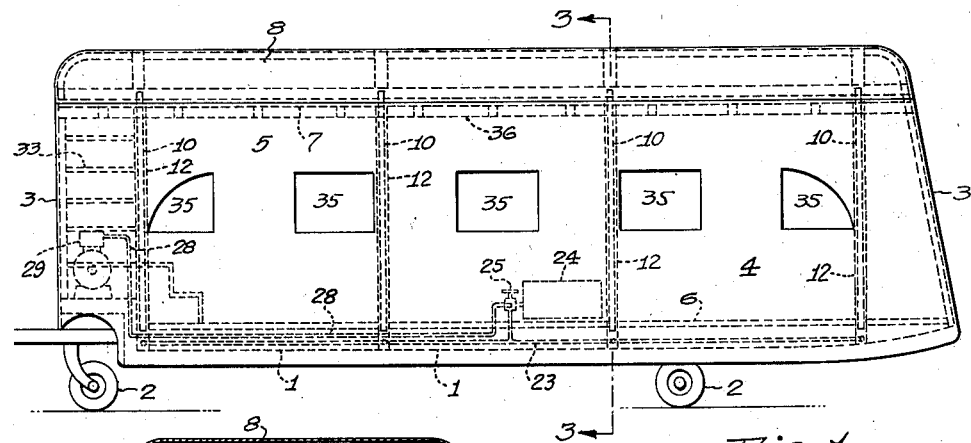
Figure 3:
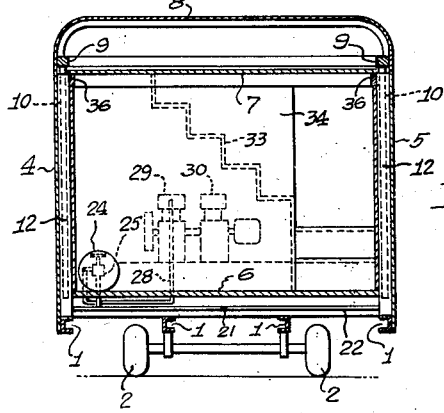
Fig. 3 is a transverse section substantially upon the line 3—3 of Fig. 1.

As shown in the accompanying drawings, the trailer is provided with the usual chassis frame indicated as a whole by the numeral 1 and which frame is supported in any suitable manner upon suitable ground wheels 2, said frame forming a support for the trailer body which is indicated as a whole by the numeral 3. This trailer body comprises side walls 4 and 5, the interior forming living quarters having a floor or lower deck 6 and a ceiling or upper deck floor 7, the upper deck being supported upon the upper edges of the side and end walls. The body also includes a movable roof section 8 comprising a suitable frame 9 adapted to support the side and end edges of the roof which edges are curved downwardly to form a finish for the roof section and to provide a chamber beneath the roof when lowered to seat said edges at the edges of the upper deck.

Secured at their upper ends to the frame 9 is a series of plungers or rods 10 which form posts for supporting and raising and lowering the roof section. These rods or plungers are each provided with a piston 11 on its lower end, which pistons are adapted to slide within vertical cylinders 12 which form posts for the support of the side walls 4 and 5 of the body, said posts being secured at their lower ends to the lower deck 6 at spaced apart points along the side edges of the deck. These cylinders are secured at their upper ends to the framing 36 forming a support for the upper deck 7 and each rod 10 is slidable through an opening in the rubber strip 37 extending along the sides and ends of the upper deck 7 and seated upon the frame 36. When the roof is lowered, the frame 9 of the roof rests upon this rubber strip 37 and thus forms a seal for the joint between the upper edges of the walls of the body and the downwardly projecting edges of the roof. It also provides a yieldable seat for the roof to prevent rattling caused by vibration of the roof and to deaden the sound by preventing these vibrations from passing downwardly into the walls of the body.

Between adjacent rods or stanchions 10 of which there are a number spaced apart along the sides of the body, are guard rail members or sections 13 each comprising a rectangular frame and open mesh grating preferably of wire 14, secured within each frame to form a guard rail extending along the side edges of the upper deck when the roof is in raised position. Each of these sections 13 of the guard rail, is pivoted as at 15 adjacent its lower corners, to the adjacent edges of the upper deck by means of U-shaped supporting members 16 to the legs of which inwardly projecting lugs 17 on the frames 13 at the lower corners thereof, are pivotally attached. Each section of the guard rail is thus pivotally supported at its lower edge to swing inwardly into parallelism with the upper deck and inwardly from the edges of said deck, so that when the roof is lowered and seated upon the upper deck, these guard rail sections will be housed within the roof, and to hold these guard rail sections in upright position when the upper deck is in use and the roof is in raised position, each rod or stanchion 10 is formed with a groove 18 which comes directly opposite the upper edges of the guard rail sections when these stanchions 10 are in up position with the roof in raised position, and attached to the upper side of the guard rail sections at adjacent sides of each stanchion 10, is slidably secured in any suitable manner, a locking slide 19, these slides each having a notched end portion to engage within the groove 18 of the stanchion, and thus when the roof is in raised position and the guard rails are swung to a vertical position, the stanchions 10 are locked in raised position by the slides 19 which slides also lock the guard rail sections 13 to the stanchions 10 and in operative position to guard against persons occupying the upper deck, falling from the deck over the sides or ends of the body, the ends of the upper deck being also provided with guard rails 20 made in sections and formed to conform to the outlines of the ends of the body, these end guard rail sections being pivotally attached in any suitable manner to the upper deck 7 to also fold inwardly beneath the roof.

To automatically raise or lower the roof 8, air under pressure is admitted into or discharged from the lower ends of the several cylinders 12 through a system of piping including a central longitudinal pipe 21 having lateral branches 22 extending to the lower ends of the several cylinders 12, and this center pipe 21 is connected by means of a branch 23 to an air tank 24 located in any convenient position, and within which branch is connected a valve indicated as a whole by the numeral 25, with a branch pipe 26 leading from the casing of the valve to the tank, the branch 23 being also connected into the valve casing together with a vent pipe 27 and an air pressure pipe 28 which leads to a pump 29 located in any convenient position and driven by a suitable motor 30, the several pipes leading into the valve casing in radial relation so that the air flow thereto and through the same is controlled by a single valve plug or member 31 rotatable within the valve casing and having a curved passage or opening 32 for connecting any two of these pipes by a rotation of the valve plug. When the plug is in the position shown in Fig. 9, the pump is directly connected to the tank 24 for pumping up a pressure in the tank, and by turning the valve to connect the pipe 26 with the pipe 23, air under pressure is supplied from the tank to the piping system extending to all of the cylinders 12 to cause the pistons in said cylinders to be forced upwardly and thus elevate the roof 8. By turning the valve plug to connect the pipe 23 with the vent pipe 27 the air confined within the several cylinders will be permitted to escape and thus allow the roof to be gradually lowered as the pressure decreases, this being controlled by the operation of the valve plug 31. By turning the valve plug 31 so that it is not in communication with any of the pipes leading into the valve casing, the air is effectively shut off from escape from the tank 24 and also from escaping from the pipe 28 leading from the pump 29 and the whole system is inoperative.

Obviously any suitable means may be provided for raising and lowering the roof section but with the pneumatically operated means shown, the force of the air under pressure is directly applied simultaneously to a plurality of points or places along the sides of the roof and therefore the roof is raised evenly and is guided and supported by the rods 10 which also serve as stanchions along the side walls of the roof and body, and with the present arrangement when the roof is in lowered position and seated upon the seating strip 37 extending along the sides and ends of the upper deck, the sides and ends of the roof being curved downwardly provides a space for housing, not only the guard rail sections which are inwardly foldable, but also a space within which folding furniture for use upon the upper deck may be housed and protected. This roof space also forms a space or chamber within which luggage may be carried and when the roof is in raised position easy access to the upper deck from the living quarters within the body, is provided by means of a stairway indicated by dotted lines at 33 located within the forward end of the body and beneath which stairway the pump 29 and motor 30 are preferably positioned, the body being provided with a transverse wall 34 adjacent the stairway for forming an end compartment in the body.

This arrangement provides a living room or other quarters within the body through which cross ventilation is provided by means of suitable windows 35 in the side walls of the body and the interior of the body may be divided by walls as found desirable, to provide sleeping quarters, the whole presenting a very neat appearance and compact arrangement with the upper open deck in easy access from the living quarters and with an arrangement whereby the roof section may be quickly and easily elevated, providing an upper open deck with the roof in position over the deck to give protection.

Obviously the particular configuration of the body and the means for raising and lowering the roof together with the means for locking the roof and guard rail sections in operative position may be varied as desired without departing from the spirit of the present invention, and I do not limit myself to the particular construction and arrangement shown.

Having thus fully described my invention what I claim is:

1. A trailer including a body having side and end walls and an upper deck supported substantially within the plane of the upper edges of said walls, a roof having a downwardly extending edge portion adapted to seat at its lower edge adjacent the edges of said upper deck, movable stanchions secured at their upper ends to said roof, guide means along the side walls of said body for said stanchions, and sectional guard rails pivotally supported by said upper deck and adapted to swing inwardly into the space within said roof when said roof is in lowered position.

2. A trailer as characterized in claim 1, and including means upon said guard rail sections for engaging said stanchions and locking said guard rail sections in vertical position between said stanchions.

3. A trailer as characterized in claim 1, and including members slidably secured to the ends of said guard rail sections and adapted to interlock with said stanchions when in raised position to lock said sections in vertical position and said stanchions in raised position.

4. A vehicle including a body having an upper deck, a hollow roof movable relative to said body and having a raised position and a lowered position, movable stanchions supporting said roof, guide means for said stanchions, and guard rails operable to swing inwardly within said roof when the roof is in its lowered position.

5. A vehicle including a body having an upper deck, a hollow roof movable relative to said body and having a raised position and a lowered position, movable stanchions for supporting said roof on said body, and sectional guard rails pivotally mounted at the upper deck and arranged to swing inwardly within the hollow roof when the roof is in its lowered position.

6. A vehicle including a body having an upper deck, a hollow roof movable relative to said body and having a raised position and a lowered position, movable stanchions for supporting said roof on said body, sectional guard rails pivotally mounted at the upper deck and arranged to swing inwardly within the hollow roof when the roof is in its lowered position, and releasable means to lock said roof in its raised position.

7. A vehicle including a body having an upper deck, a hollow roof having an opening overlying said deck, said roof being movable relative to said deck and having a raised position and a lowered position, pneumatic means to raise said roof guard rails mounted on said deck and arranged to move inwardly within said hollow roof when said roof is in lowered position, and releasable means for locking said roof in its raised position.

WILLARD J. MILLER.